(12) United States Patent
Bärecke et al.

(10) Patent No.: US 10,942,033 B2
(45) Date of Patent: Mar. 9, 2021

(54) METHOD FOR DETERMINING A TRAJECTORY FOR AN AUTONOMOUSLY-DRIVEN TRANSPORTATION VEHICLE, CONTROL DEVICE, AND TRANSPORTATION VEHICLE

(71) Applicant: VOLKSWAGEN AKTIENGESELLSCHAFT, Wolfsburg (DE)

(72) Inventors: Frank Bärecke, Wolfsburg (DE); Marc Blumentritt, Braunschweig (DE); Stefan Kukla, Wathlingen (DE)

(73) Assignee: Volkswagen Aktiengesellschaft

( * ) Notice: Subject to any disclaimer, the term of this patent is extended or adjusted under 35 U.S.C. 154(b) by 254 days.

(21) Appl. No.: 16/038,839

(22) Filed: Jul. 18, 2018

(65) Prior Publication Data
US 2019/0025067 A1 Jan. 24, 2019

(30) Foreign Application Priority Data
Jul. 19, 2017 (DE) .................... 10 2017 212 373.7

(51) Int. Cl.
*G01C 21/34* (2006.01)
*B60W 30/095* (2012.01)
(Continued)

(52) U.S. Cl.
CPC ....... *G01C 21/3415* (2013.01); *B60W 30/095* (2013.01); *B60W 50/14* (2013.01);
(Continued)

(58) Field of Classification Search
CPC . G01C 21/3415; B60W 30/095; B60W 50/14; B60W 2050/143; B60W 2710/22;
(Continued)

(56) References Cited

U.S. PATENT DOCUMENTS 5,813,350 A * 9/1998 Ochi ................. A63G 7/00
104/54
8,868,328 B1 * 10/2014 Estkowski .......... G08G 5/0034
701/301
(Continued)

FOREIGN PATENT DOCUMENTS

DE 102010013339 A1 1/2011
DE 102011081159 A1 2/2013
(Continued)

OTHER PUBLICATIONS

Search Report for German Patent Application No. 10 2017 212 373.7; dated Feb. 6, 2018.

*Primary Examiner* — Behrang Badii
*Assistant Examiner* — Daniel L Greene
(74) *Attorney, Agent, or Firm* — Barnes & Thornburg LLP

(57) ABSTRACT

A method for determining an alternative trajectory for an autonomously-driven transportation vehicle wherein an alternative trajectory for the transportation vehicle is calculated by a control device in response to an obstacle being detected by a transportation vehicle sensor device, which trajectory replaces at least one portion of an original trajectory of the transportation vehicle so the trajectory has a minimum total disturbance of at least one disturbance summand, consisting of a respective weighting factor and one disturbance value.

21 Claims, 3 Drawing Sheets

(51) Int. Cl.
*B60W 50/14* (2020.01)
*G05D 1/00* (2006.01)
*G06K 9/00* (2006.01)

(52) U.S. Cl.
CPC ....... *G05D 1/0088* (2013.01); *G06K 9/00805* (2013.01); *B60W 2050/143* (2013.01); *B60W 2554/00* (2020.02); *B60W 2710/22* (2013.01); *B60W 2710/226* (2013.01); *G05D 2201/0213* (2013.01)

(58) Field of Classification Search
CPC ........ B60W 2710/226; B60W 2554/00; G06K 9/00805; G05D 2201/0213
See application file for complete search history.

(56) References Cited

U.S. PATENT DOCUMENTS

| | | | |
|---|---|---|---|
| 9,535,423 B1 | 1/2017 | Debreczeni | |
| 2008/0234912 A1* | 9/2008 | Choi | B60T 8/243 701/83 |
| 2011/0126948 A1* | 6/2011 | Boyer | B60B 9/04 152/40 |
| 2011/0315459 A1* | 12/2011 | Zuchoski | B62D 55/04 180/9.21 |
| 2014/0222287 A1* | 8/2014 | Popham | B60G 17/0165 701/37 |
| 2014/0260233 A1* | 9/2014 | Giovanardi | F15B 13/0444 60/431 |
| 2014/0303844 A1* | 10/2014 | Hoffmann | B60G 17/02 701/37 |
| 2015/0112512 A1* | 4/2015 | Fan | B60G 17/02 701/2 |
| 2015/0224845 A1* | 8/2015 | Anderson | B60G 17/052 701/37 |
| 2015/0241173 A1* | 8/2015 | Carter | G05D 1/107 244/3.15 |
| 2016/0304190 A1* | 10/2016 | Grohmann | B64C 27/605 |
| 2016/0325753 A1* | 11/2016 | Stein | G06K 9/46 |
| 2016/0339910 A1* | 11/2016 | Jonasson | G05D 1/0061 |
| 2017/0090478 A1 | 3/2017 | Blayvas et al. | |
| 2017/0330044 A1* | 11/2017 | Telpaz | B60K 35/00 |
| 2018/0203451 A1* | 7/2018 | Cronin | G05D 1/0088 |

FOREIGN PATENT DOCUMENTS

| | | |
|---|---|---|
| DE | 102012018122 A1 | 3/2013 |
| DE | 102013009082 A1 | 12/2013 |
| DE | 102012215562 A1 | 3/2014 |
| DE | 102013200385 A1 | 7/2014 |
| DE | 102013016434 A1 | 4/2015 |
| DE | 102014223000 A1 | 5/2016 |
| DE | 102015015306 A1 | 5/2016 |
| DE | 102015208790 A1 | 11/2016 |
| DE | 102015013143 A1 | 4/2017 |
| DE | 102016121873 A1 | 5/2017 |
| EP | 2821307 A1 | 1/2015 |
| EP | 3103695 A2 | 12/2016 |
| GB | 2525839 A | 11/2015 |

* cited by examiner

|  | T1 | T2 | T3 |
|---|---|---|---|
| $y1=w1x1$ | 200 | 50 | 10 |
| $y2=w2x2$ | 10 | 80 | 1 |
| $y3=w3x3$ | 1 | 5 | 40 |
| $y4=w4x4$ | 10 | 10 | 80 |
| $y5=w5x5$ | 30 | 5 | 1 |
| $y6=w6x6$ | 3 | 10 | 15 |
| $y7=w7x7$ | 0 | 0 | 0 |
| S | S1=254 | S2=160 | S3=147 |

Fig.2

METHOD FOR DETERMINING A TRAJECTORY FOR AN AUTONOMOUSLY-DRIVEN TRANSPORTATION VEHICLE, CONTROL DEVICE, AND TRANSPORTATION VEHICLE

PRIORITY CLAIM

This patent application claims priority to German Patent Application No. 10 2017 212 373.7, filed 19 Jul. 2017, the disclosure of which is incorporated herein by reference in its entirety.

SUMMARY

Illustrative embodiments relate to a method for determining a trajectory for an autonomously-driven transportation vehicle and to a control device and a transportation vehicle.

BRIEF DESCRIPTION OF THE DRAWINGS

An exemplary embodiment is described in the following drawings, in which:

FIG. 2 shows a possible set of disturbance summands of different alternative trajectories.

DETAILED DESCRIPTION

Figure 1:
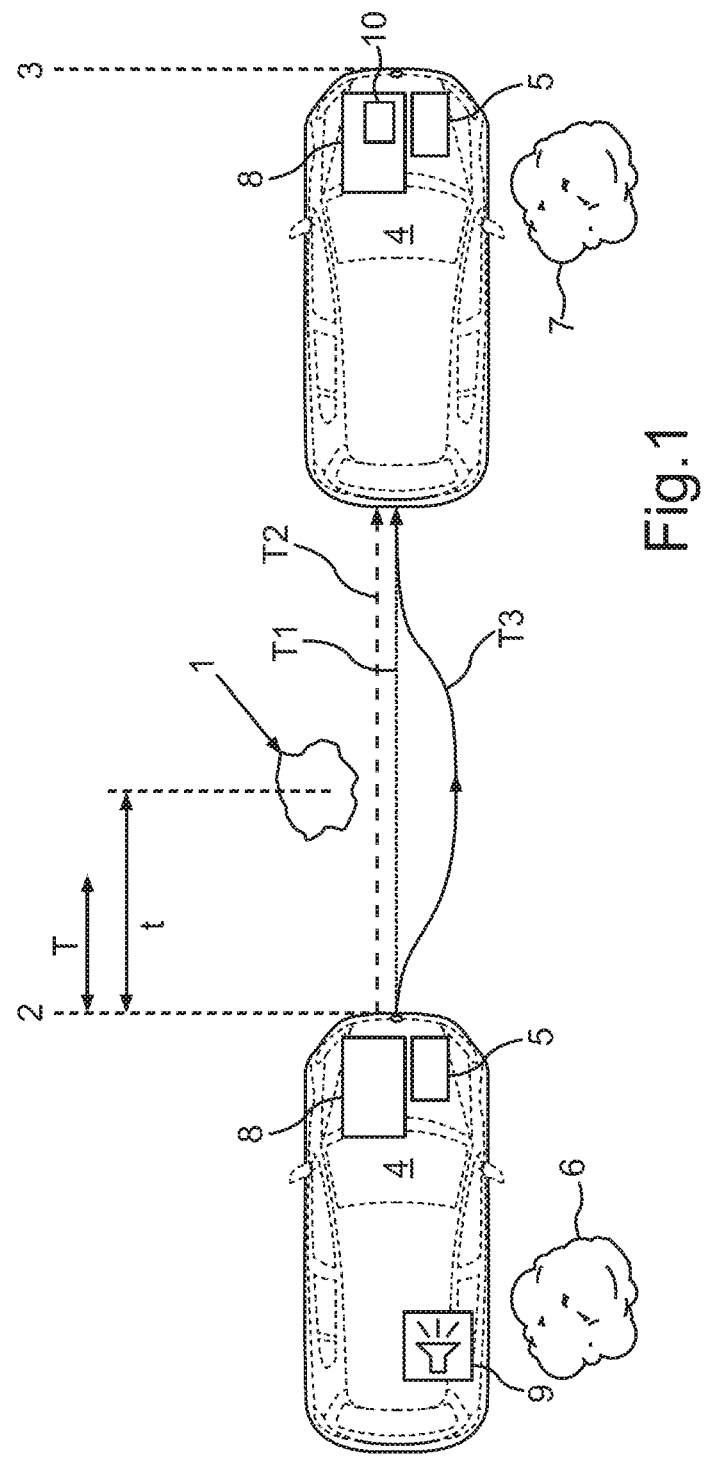
FIG. 1 shows possible trajectories for circumventing a detected obstacle.

To limit the adverse impact on a transportation vehicle and the discomfort experienced by its occupants to a minimum during an autonomous control of the transportation vehicle, it is necessary to allow for variations in the speed or the driving trajectory. This consideration becomes mandatory when an obstacle appears and pursuing the original trajectory would lead to damage to the transportation vehicle or injury to the occupants. In the choice of an alternative trajectory it is desirable to choose the alternative trajectory which leads to minimal adverse impact on the transportation vehicle and the occupants of the transportation vehicle.

In DE 10 2013 200 385 A1, a method and a device are described for supporting a driver of a transportation vehicle while driving on rough terrain. In one of the functions provided, information is obtained for guiding the transportation vehicle on an ideal trajectory and for steering the transportation vehicle automatically by a driver assistance system, wherein information about an environment around the transportation vehicle is scanned, to avoid further hazards.

In DE 10 2012 018 122 A1 a method for autonomous guiding of a transportation vehicle on a track while circumventing uneven surfaces is described. In this method an autonomous guiding of a transportation vehicle on a track according to a planned target trajectory is proposed, wherein the target trajectory is planned in accordance with detected surface irregularities.

Disclosed embodiments provide a method which minimizes an adverse impact on a transportation vehicle and the transportation vehicle occupants due to an obstacle.

According to the disclosed embodiments, a method for determining an alternative trajectory for an autonomously driven transportation vehicle is provided. In this case, starting from an original trajectory, when an obstacle is detected by a transportation vehicle sensor device, the alternative trajectory for the transportation vehicle is calculated by a control device, which trajectory replaces at least a portion of the original trajectory of the transportation vehicle. The alternative trajectory has a minimum disturbance sum of disturbance summands, consisting of a respective weighting factor and a disturbance value. In other words, at least a portion of an original trajectory is replaced by an alternative trajectory for a transportation vehicle, when an obstacle is detected by a transportation vehicle sensor device. In doing so, the type of alternative trajectory is chosen such that it has a minimum disturbance sum. Another name for such a disturbance sum is a cost function. The disturbance sum is formed from disturbance summands, which consist of a respective weighting factor and a disturbance value.

A trajectory can be a path curve, which can assign a location, a speed and/or an acceleration to the transportation vehicle, for example, as a function of time or location. The autonomously-driven transportation vehicle can comprise a control device, which is configured to determine the alternative trajectory and to control the transportation vehicle in accordance with the alternative trajectory. The transportation vehicle can also comprise a transportation vehicle sensor device, which is configured to capture the surroundings of the transportation vehicle. An obstacle can be an object in the surroundings of the transportation vehicle, which can pose a risk to the transportation vehicle, the transportation vehicle occupants and/or the road traffic in accordance with a predefined classification. The obstacle can be, for example, a pothole, a stone, or other road users. The control device can comprise a microprocessor and/or a microcontroller for carrying out the method. An alternative trajectory can be a trajectory that replaces at least a portion of an original trajectory. The alternative trajectory can be chosen such that it has a minimum disturbance sum. The disturbance sum is a value which evaluates a particular alternative trajectory in terms of its adverse impact on the transportation vehicle and/or the occupants. The optimal alternative trajectory for a situation is defined by a minimum value for the disturbance sum. The disturbance sum is the sum of at least one disturbance summand, which consists of a disturbance value and a weighting factor. It therefore represents an overall disturbance balance, which can be used for an optimization of an alternative trajectory. A respective disturbance value describes the extent of a negative impact on the transportation vehicle or the transportation vehicle occupants. A respective weighting factor is multiplied by the disturbance value and therefore enables certain types of disturbances to be weighted. The minimum value of the disturbance can be related to a set of disturbance sums, which is assigned to a family of trajectories. For example, it may be that a plurality of alternative trajectories is calculated by the control device using different algorithms, if the transportation vehicle sensor device detects, for example, a pothole in the road. The determination of an alternative trajectory can be made by using a gradient-based optimization method, using neural networks or other methods. To determine an optimal alternative trajectory, the alternative trajectory which has the smallest disturbance sum of all alternative trajectories can be selected. A decision logic for choosing an alternative trajectory can be represented, for example, as a fuzzy controller. This alternative trajectory can replace at least one partial section of the original trajectory. In the disclosed embodiments, an objective selection criterion is provided for a holistic determination of the optimum alternative trajectory.

An extension of the method provides that at least one disturbance summand describes transportation vehicle dynamics and/or a transportation vehicle wear and/or a fuel consumption and/or an adverse impact on a transportation vehicle occupant by a quantification function. In other words, at least one disturbance summand quantifies transportation vehicle dynamics and/or a transportation vehicle wear and/or a fuel consumption and/or a negative subjective perception of a transportation vehicle occupant, which cannot be described by any of the other disturbance summands, of an alternative trajectory. The transportation vehicle dynamics can comprise, for example, longitudinal dynamics, lateral dynamics and/or vertical dynamics of the transportation vehicle. The wear on the transportation vehicle can comprise, for example, the component wear induced by a respective alternative trajectory. The fuel consumption can describe, for example, an increased gasoline consumption or an increased battery discharge when traversing a particular alternative trajectory. As another example, by the disturbance summands relating to the adverse impact on a transportation vehicle occupant, a small distance to a tree or a brief period of driving on another driving lane while following an alternative trajectory can be assessed. It may be that the examples cited in the respective situations pose no risk, but nevertheless induce a negative sensation in the transportation vehicle occupants. Within the disclosed method, it becomes possible to select an alternative trajectory which has a minimum negative impact on the transportation vehicle and/or the occupants.

An extension provides that the alternative trajectory defines a parameter of an adapted suspension system or adapted vertical dynamics control system. In other words, in addition to a course of the road the alternative trajectory also describes a parameter of an adapted suspension system or of an adapted vertical dynamics control system. For example, the trajectory can comprise values relating to the damping behavior of a shock absorber. An adaptive suspension system and/or an adaptive vertical dynamics control system is controlled in such a way that the effects of an obstacle are minimized.

An extension provides that the at least one weighting factor is a function of other disturbance summands. In other words, the at least one weighting factor is not a constant, but has a value that depends on other disturbance summands. For example, it may be the case that a weighting factor that refers to the lateral dynamics of the transportation vehicle depends on the disturbance summand that refers to the speed of the transportation vehicle. This means that the device can take into account the fact that a large transverse dynamic of the transportation vehicle has greater negative effects at a high speed than at a low speed. The disclosed embodiments provide for certain correlations to be taken into account.

An extension of the disclosure provides that at least one weighting factor is set in accordance with a user input. In other words, a transportation vehicle occupant can change at least one value of a weighting factor. For example, a transportation vehicle occupant can increase the weighting factor which is assigned to a transportation vehicle wear, so that this is taken into account to a greater degree in the choice of the alternative trajectory. The disclosed embodiments allow a transportation vehicle occupant to set priorities according to which an alternative trajectory is to be selected.

An extension provides that a log file is stored in the control device, wherein this file comprises the information collected by the transportation vehicle sensor devices, the original trajectory, the at least one alternative trajectory and the values of the disturbance summands assigned thereto. In other words, data which relate to the detected obstacle are stored in a log file together with the possible alternative trajectories, including their disturbance summands. For example, the control device can store the information collected by the transportation vehicle sensors relating to the obstacle in a memory. In addition, the control device can store calculated trajectories and their associated disturbance summands. Finally, the selected alternative trajectory can also be stored in the log. This results in the decision-making process being logged in a comprehensible form. It is therefore possible to understand decision-making and optimization processes and subsequently improve them retrospectively. In addition, an evaluation and/or optimization, for example, of the algorithms or the weighting factors can be performed in the transportation vehicle and/or centrally at the manufacturer. To retrospectively adjust the weighting factors, if a need for optimization in the selection procedure is determined.

An extension provides that when a portion of the original trajectory is replaced by the alternative trajectory, a warning signal is issued. In other words, the replacement of a portion of the original trajectory by an alternative trajectory leads to the issue of a warning signal. For example, a warning sound or a visual warning signal can be issued, coupled with precise information on the course of the alternative trajectory, which can be displayed on a screen in the transportation vehicle interior. This results in the occupants of the transportation vehicle reacting to the initiation of an alternative trajectory and, for example, securing themselves.

An extension provides that at least a portion of the alternative trajectory is calculated by a predefined time-optimized procedure, if the temporal distance to the obstacle falls below a required value. In other words, at least a portion of the alternative trajectory is calculated by a procedure which is time-optimized, if the temporal distance to the obstacle falls below a required value. For example, the control device can be configured to use an algorithm to calculate the alternative trajectory if an obstacle is detected by the transportation vehicle sensor devices at short notice, and the available time is not sufficient to use a standard algorithm. It may be that this algorithm does not use all the disturbance summands to form a disturbance sum. It may be that the entire alternative trajectory is calculated using the time-optimized procedure, or a first portion of an alternative trajectory, wherein a remaining portion of the alternative trajectory is calculated by a standard algorithm. This results in the obstacles being detected at short notice so they can be reacted to.

The disclosed embodiments also include the control device for the transportation vehicle. The control device has a processor device, which is configured to carry out an exemplary embodiment of the disclosed method. For this purpose, the processor device can have at least one microprocessor and/or at least one microcontroller. Furthermore, the processor device can have program code which is configured, when executed by the processor device, to carry out the exemplary embodiment of the disclosed transportation method. The program code can be stored in a data memory of the processor device.

The disclosed embodiments also comprise a transportation vehicle, which comprises a control device for carrying out the disclosed method, and a transportation vehicle sensor device.

The disclosed embodiments also include extensions of the disclosed transportation vehicle or the disclosed control device, which have features that have already been described in the context of the extensions of the disclosed method. For this reason, the corresponding extensions of the disclosed method are not described again here.

The exemplary embodiment described in the following relates to an optional embodiment. In the exemplary embodiment, the components of the disclosed embodiment described represent individual features to be considered independently of each other, which also extend the disclosed embodiments independently of each other and thus are also to be regarded, either individually or in a combination other than the one shown, as an integral part of the disclosure. Furthermore, the embodiment described can also be extended to include other features of the disclosure already described.

In the figures, functionally equivalent elements are provided with the same reference numerals.

FIG. 1 shows possible trajectories T1, T2, T3 for circumventing a detected obstacle 1. The exemplary embodiment assumes that a transportation vehicle 4 is following an original trajectory, on which an obstacle 1 is detected by a transportation vehicle sensor device 5. In response to this an alternative trajectory T1, T2, T3 is to be determined. FIG. 1 shows the original trajectory T1 between two positions 2, 3 of the transportation vehicle 4 and two alternative trajectories T2, T3. The obstacle 1 can be, for example, a pothole on a road, which is detected by a transportation vehicle sensor device 5. The transportation vehicle sensor device 6 can be configured to detect a height profile of the roadway. In addition, further obstacles, such as two trees 7, can be detected by the transportation vehicle sensor device 5. It may be that a control device 8 of the transportation vehicle 4 has determined three alternative trajectories T1, T2, T3, wherein one matches the original trajectory T1 for a portion, an alternative trajectory T2 provides for passing over the pothole with a speed adjustment and an adjustment of an adaptive vertical dynamics control system of the transportation vehicle 4, and a third T3 provides for making a detour around the pothole. It may be that the control device 8 for each of the alternative trajectories T1, T2, T3 calculates a disturbance sum S1, S2, S3, which comprises disturbance summands y1, y2, y3, y4, y5, y6, y7, which relate to a vertical dynamics of the transportation vehicle y1, a longitudinal dynamics y2 of the transportation vehicle 4, a lateral dynamics y3 of the transportation vehicle 4, an adverse impact on the transportation vehicle occupants y4, a wear on the axle y5, a wear on the tires y6 and an increased fuel consumption y7. It may be that the impact on the transportation vehicle occupants y5 due to the proximity of the transportation vehicle to the trees during an avoidance maneuver has a higher value than in the other alternative trajectories. It may be that the trajectory T3, which describes an avoidance maneuver, has the smallest disturbance sum S3. It may be that the control device 8 then selects the alternative trajectory T3, which describes an avoidance, and controls the transportation vehicle 4 accordingly. It may be that the control device 8 informs the occupants of the transportation vehicle by a warning signal 9 inside the transportation vehicle about the initiation and the course of the alternative trajectory. In a next operation, the control device 8 can steer the transportation vehicle 4 along the trajectory T3 which has the smallest disturbance sum S3.

FIG. 2 shows a possible listing of the disturbance summands y1, y2, y3, y4, y5, y6, y7, of the three alternative trajectories T1, T2, T3, which relate to a vertical dynamics of the transportation vehicle y1, a longitudinal dynamics y2 of the transportation vehicle 4, a lateral dynamics y3 of the transportation vehicle 4, an adverse impact on the transportation vehicle occupants y4, a wear on the axle y5, a wear on the tires y6 and an increased fuel consumption y7. It may be that every disturbance summand y1, y2, y3, y4, y5, y6, y7 is the product of a disturbance value x1, x2, x3, x4, x5, x6, x7 and a respective weighting factor w1, w2, w3, w4, w5, w6, w7. It may be that at least one weighting factor w1, w2, w3, w4, w5, w6, w7 is dependent on the value of at least one disturbance summand y1, y2, y3, y4, y5, y6, y7.

Figure 3:
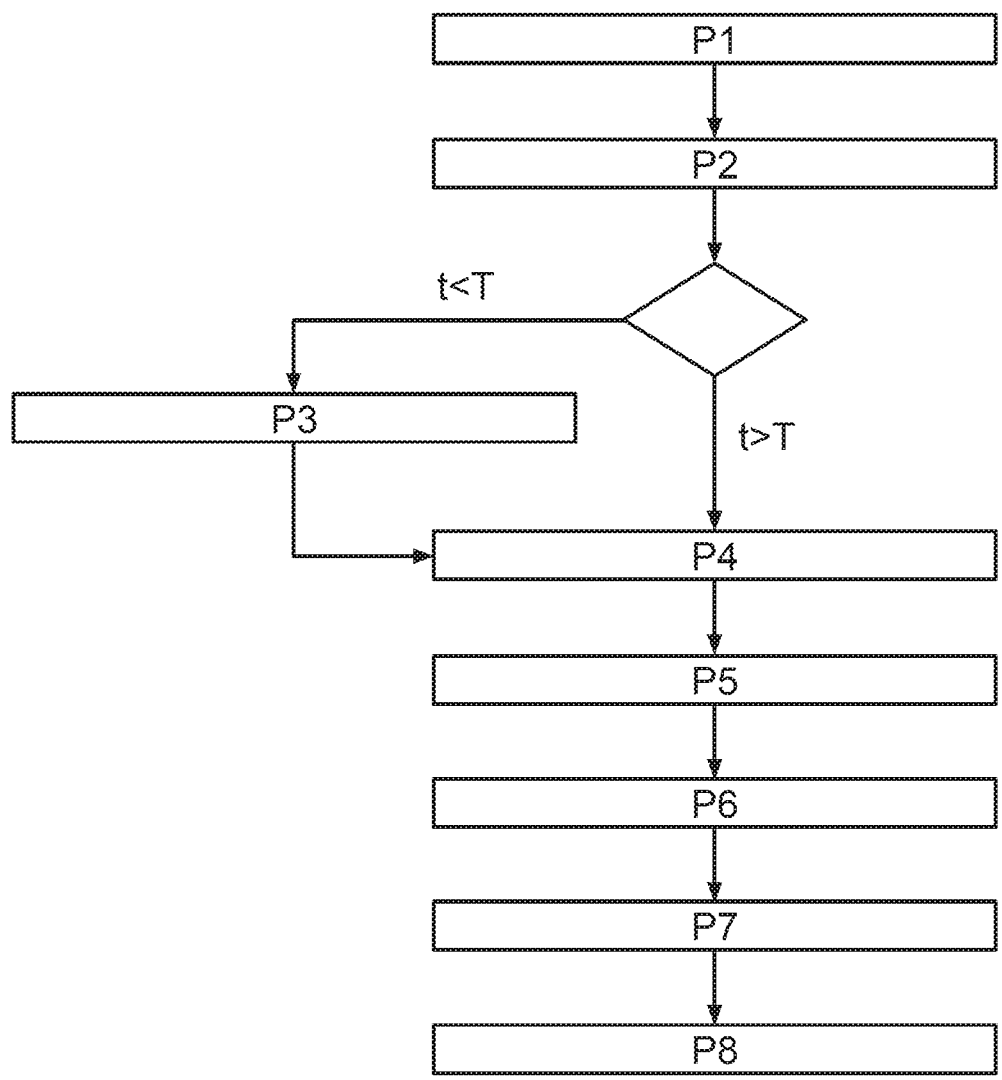
FIG. 3 shows a possible sequence of a disclosed method.

FIG. 3 shows a possible sequence of a disclosed method. It may be that an obstacle 1 is detected by the transportation vehicle sensor device 5 (P1). Thereupon, a temporal distance t until the obstacle 1 is reached can be determined (P2). It may be that the temporal distance t is less than a required temporal distance T to the obstacle 1. It may be that a first portion of an alternative trajectory T1, T2, T3 is then calculated by a time-optimized procedure (P3). A remaining part can be calculated by a standard method. It may be that the temporal distance t exceeds a required temporal distance T to the obstacle 1, in which case the trajectories T1, T2, T3 can be determined by an ordinary algorithm (P4). The trajectory T1, T2, T3 to be followed can be selected by a comparison of the disturbance sums S1, S2, S3 (P5). It may be that before the portion of the original trajectory is replaced by an alternative trajectory T1, T2, T3, a warning signal 9 is issued (P5). The control device can steer the transportation vehicle along the selected alternative trajectory (P6). It may be that a log file 10 is stored in the control device 8, wherein this file comprises the information collected by the transportation vehicle sensor device 5, the original trajectory, the at least one alternative trajectory T1, T2, T3 and the values of the disturbance summands y1, y2, y3, y4, y5, y6 assigned thereto (P7). It may be that an occupant of the transportation vehicle 4 increases a value of a weighting factor w1, w2, w3, w4, w5, w6, w7 relating to a transverse dynamics x3 of the transportation vehicle 4, so that alternative trajectories T1, T2, T3, which lead to large transverse dynamics of the transportation vehicle, are carried out with low priority (P8). On the basis of the alternative trajectory the control device 8 can then guide the transportation vehicle 4 around the obstacle 1.

To achieve a maximum level of comfort for an autonomous transportation vehicle, a consideration of speed variations or a different driving trajectory sometimes makes sense.

This consideration becomes mandatory, if by continuing to drive normally a large pothole or a speed bump (speed breaker) would damage the suspension or might cause injury to the occupants.

In a first consideration, one could simply define a maximum speed and then drive at this speed in the same lane over the uneven surface.

The drawbacks of this approach are obvious: regardless of the size of the special event, the maximum level of discomfort is always experienced.

For smaller obstacles that are below the maximum acceptable discomfort, the entire level of discomfort is always experienced.

The starting point is the definition of a global disturbance balance as a weighted sum of all individual disturbances. Everything which is worse than driving without a vertical dynamic obstacle is counted as a disturbance. Comparable to a cost function in control engineering.

This includes vertical costs—lateral and longitudinal (reverse) costs, the driver's irritations due to the driving lane, increased fuel consumption and brake wear, component impacts (wear on drive shaft, tires, etc.).

The extent of the disturbance will primarily be determined directly from the individual sizes. It actually is not necessarily proportionally related, but assessed commensurately. A combination of different costs, if this is deemed appropriate, can increase or reduce the weighting of the disturbances or be evaluated in a recombined form.

In an example situation, which relates to a journey with a pothole as an obstacle, an evaluation of three driving scenarios can occur: driving over it without braking, driving over it slowly and taking a detour around the pothole.

It can be deduced that in this case the detour is the most favorable scenario.

As soon as slightly less space is available though, for example, because the pothole is slightly wider, the detour can become impossible. If the pothole is considerably shorter, then, for example, driving over it without a speed adjustment may be the optimal choice.

The optimization of convenience, that is to say, the minimization of disturbance, constitutes a major challenge according to the definition of the global disturbance balance.

For this purpose, in addition to gradient-based optimization methods new methods are also available, such as searching for an optimal trajectory (including speed profile and activation of the vertical dynamics control system) with neural networks. A decision logic can be represented as a fuzzy controller, for example.

The application of an optimization technique to the global optimization of the driving situation to be negotiated is only made possible by the use of the global disturbance balance. The observance of "hard constraints" (edge of the road, distance to pedestrians, speed limits) should be provided by the optimization algorithm. If in addition to hard limits, for example, for passing pedestrians, there is an "allowed range", then it is possible to treat an intrusion as a disturbance in the global disturbance balance.

For the introduction of a global optimization function there is insufficient experience available as to which discomfort costs should be weighted against each other and in what way.

To check the plausibility of the weighting factors, the transportation vehicle (on the test track with selected obstacles) can drive along different semi-optimal trajectories with equal disturbances. Experts can then assess whether the disturbances that are accepted are actually equal, or whether an adjustment to the weighting must be made.

For real driving situations, in individual cases the environmental conditions in which local optima (with a similar disturbance) have been found for very different trajectories can be stored. Here, the experts can investigate whether the trajectories found are in fact equivalent or an adjustment to the weights must be made.

The computationally complex optimization methods are run in a time-critical environment. This means that under certain circumstances the computation time may not be sufficient to find an optimum solution. The transportation vehicle can thus determine a partially optimized trajectory before the optimization process has been completed.

Here it is proposed to store the environmental data in a memory and then to evaluate offline whether an optimization potential can be found for the algorithms for determining trajectories. In this case, the data can be sent back to the OEM and an optimization of the algorithms performed there. The data can be transmitted to a central computer (cloud). The offline evaluation can take place using an appropriate methodology, for example, an artificial intelligence (AI) system in the control device of the transportation vehicle.

It is possible that, depending on how many drivers are in the transportation vehicle and what actions are performed by them, other weighting factors should be used.

For example, a sleeping transportation vehicle occupant is relatively indifferent to the distance by which a car drives past an obstacle. A transportation vehicle occupant who is observing the roadway closely can accept a significantly higher lateral acceleration and lane deviation if they are informed about avoiding a pothole (augmented reality).

A passenger engrossed in a book can be warned of an imminent change in the direction of the transportation vehicle by a brief jolt, a light or a sound.

It is also possible that different transportation vehicle occupants may have other weightings for their sense of well-being. For this reason, it can make sense to make individual weighting factors individually adaptable within limits.

Overall, the example shows how an adverse effect on a transportation vehicle and its occupants is minimized by the disclosed embodiments.

LIST OF REFERENCE NUMERALS 1 obstacle
2 starting position
3 end position
4 transportation vehicle
5 transportation vehicle sensor device
6 tree
7 tree
8 control device
9 warning signal
10 log file
T1-T3 alternative trajectories
S1-S3 disturbance sums
y1-y7 disturbance summands
x1-x7 disturbance values
w1-w7 weighting factors
t temporal distance to the obstacle
T required temporal distance

The invention claimed is:

1. A system for an autonomously-driven transportation vehicle, the system comprising:
   a sensor device configured to detect an obstacle along a first trajectory of the transportation vehicle; and
   a control device coupled to the sensor device and configured to:
      in response to the obstacle being detected, calculate a plurality of alternative trajectories for avoiding the obstacle with the transportation vehicle, wherein each of the alternative trajectories comprises a corresponding disturbance summand including a different one of a respective weighting factor and a respective disturbance value,
      select one of the plurality of alternative trajectories, wherein the selection of the one of the alternative trajectories is based on a stored file that includes information collected by the sensor device for a previous first trajectory, at least one alternative trajectory for the previous first trajectory, and respective disturbance summands for the previous first trajectory and the at least one previous alternative trajectory,
      replace at least a portion of the first trajectory with the selected one of the plurality of alternative trajectories to generate a second trajectory, and
      operate the transportation vehicle along the second trajectory to avoid the obstacle.

2. The control device of claim 1, wherein the at least one disturbance summand describes a transportation vehicle dynamics and/or a transportation vehicle wear and/or a transportation vehicle fuel consumption and/or a stress of a transportation vehicle occupant by a quantification function.

3. The control device of claim 1, wherein the alternative trajectory defines a parameter of an adaptive suspension system and/or an adaptive vertical dynamics control system.

4. The control device of claim 1, wherein the at least one weighting factor depends on other disturbance summands.

5. The control device of claim 1, wherein the value of at least one weighting factor is set according to a user input.

6. The control device of claim 1, wherein a warning signal issues when a portion of the original trajectory is replaced by the alternative trajectory.

7. The control device of claim 1, wherein at least a portion of the alternative trajectory is calculated by a predefined time-optimized procedure in response to the temporal distance to the obstacle falling below a required value.

8. A transportation vehicle comprising:
a control device for determining an alternative trajectory for an autonomously-driven transportation vehicle, the control device being configured to:
in response to an obstacle being detected along a first trajectory of the transportation vehicle by a sensor device communicatively coupled to the control device, calculate a plurality of alternative trajectories for avoiding the obstacle with the transportation vehicle, wherein each of the alternative trajectories comprises a corresponding disturbance summand including a different one of a respective weighting factor and a respective disturbance value,
select one of the plurality of alternative trajectories, wherein the selection of the one of the alternative trajectories is based on a stored file that includes information collected by the sensor device for a previous first trajectory, at least one alternative trajectory for the previous first trajectory, and respective disturbance summands for the previous first trajectory and the at least one previous alternative trajectory,
replace at least a portion of the first trajectory with the selected one of the plurality of alternative trajectories to generate a second trajectory, and
operate the transportation vehicle along the second trajectory to avoid the obstacle.

9. The transportation vehicle of claim 8, wherein the at least one disturbance summand describes a transportation vehicle dynamics and/or a transportation vehicle wear and/or a transportation vehicle fuel consumption and/or a stress of a transportation vehicle occupant by a quantification function.

10. The transportation vehicle of claim 8, wherein the alternative trajectory defines a parameter of an adaptive suspension system and/or an adaptive vertical dynamics control system.

11. The transportation vehicle of claim 8, wherein the at least one weighting factor depends on other disturbance summands.

12. The transportation vehicle of claim 8, wherein the value of at least one weighting factor is set according to a user input.

13. The transportation vehicle of claim 8, wherein a warning signal issues when a portion of the original trajectory is replaced by the alternative trajectory.

14. The transportation vehicle of claim 8, wherein at least a portion of the alternative trajectory is calculated by a predefined time-optimized procedure in response to the temporal distance to the obstacle falling below a required value.

15. A method for determining an alternative trajectory for an autonomously-driven transportation vehicle, the method comprising:
in response to an obstacle being detected along a first trajectory of the transportation vehicle by a sensor device of the transportation vehicle, calculating a plurality of alternative trajectories for avoiding the obstacle with the transportation vehicle, wherein each of the alternative trajectories comprises a corresponding disturbance summand including a different one of a respective weighting factor and a respective disturbance value,
selecting one of the plurality of alternative trajectories, wherein the selection of the one of the alternative trajectories is based on a stored file that includes information collected by the sensor device for a previous first trajectory, at least one alternative trajectory for the previous first trajectory, and respective disturbance summands for the previous first trajectory and the at least one previous alternative trajectory,
replacing at least a portion of the first trajectory with the selected one of the plurality of alternative trajectories to generate a second trajectory, and
operating the transportation vehicle along the second trajectory to avoid the obstacle.

16. The method of claim 15, wherein at least one disturbance summand describes a transportation vehicle dynamics and/or a transportation vehicle wear and/or a transportation vehicle fuel consumption and/or a stress of a transportation vehicle occupant by a quantification function.

17. The method of claim 15, wherein the alternative trajectory defines a parameter of an adaptive suspension system and/or an adaptive vertical dynamics control system.

18. The method of claim 15, wherein at least one weighting factor depends on other disturbance summands.

19. The method of claim 15, wherein the value of at least one weighting factor is set according to a user input.

20. The method of claim 15, wherein a warning signal issues when a portion of the original trajectory is replaced by the alternative trajectory.

21. The method of claim 15, wherein at least a portion of the alternative trajectory is calculated by a predefined time-optimized procedure in response to the temporal distance to the obstacle falling below a required value.

* * * * *